Nov. 16, 1943.   J. D. WICKS   2,334,664
FILTER REPLACEMENT UNIT
Filed Feb. 25, 1943   2 Sheets-Sheet 1
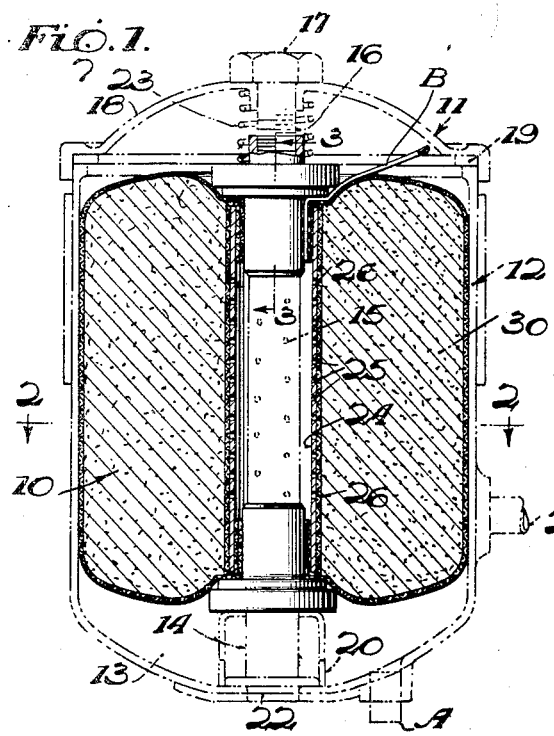
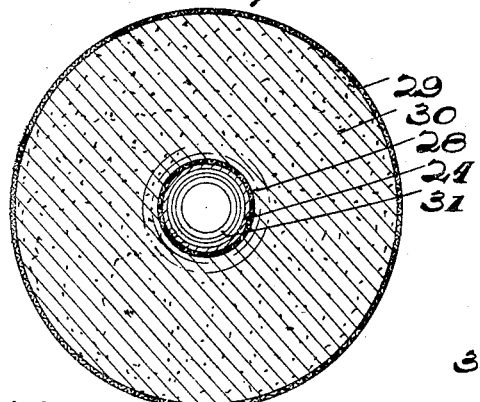
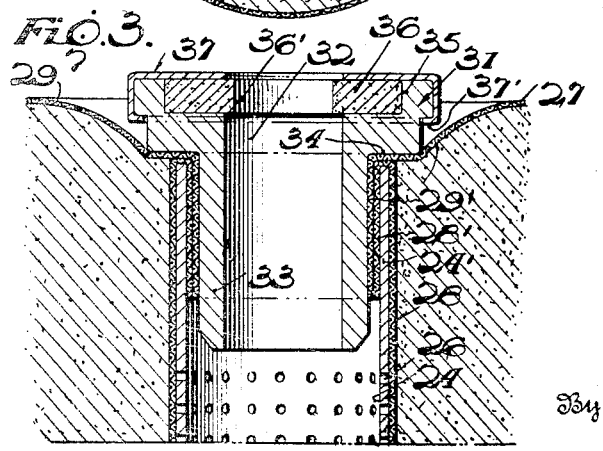
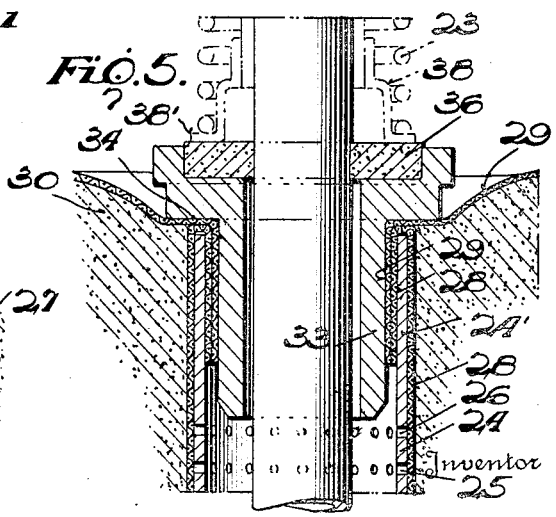
John D. Wicks.

Nov. 16, 1943.   J. D. WICKS   2,334,664
FILTER REPLACEMENT UNIT
Filed Feb. 25, 1943   2 Sheets-Sheet 2
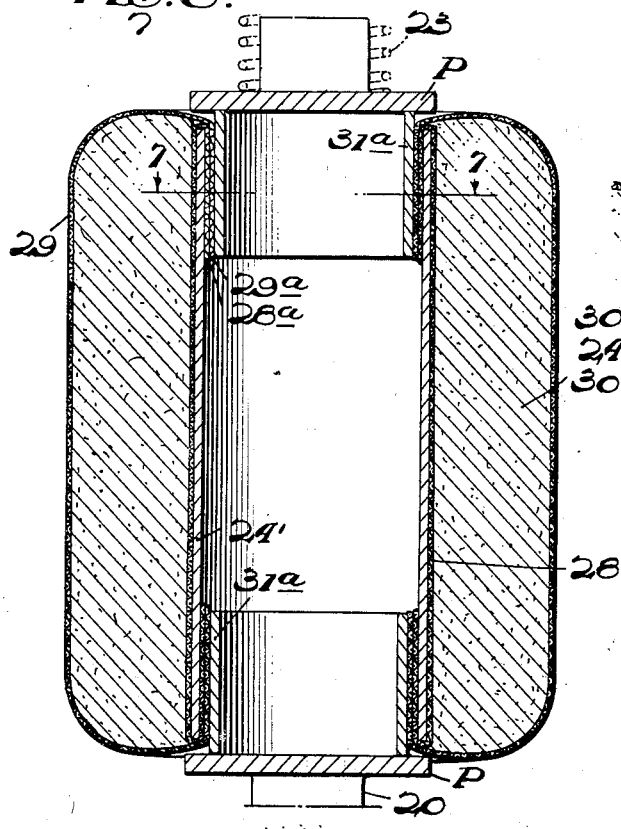
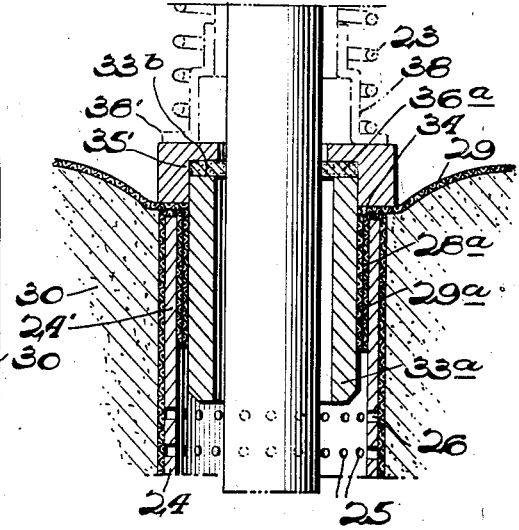
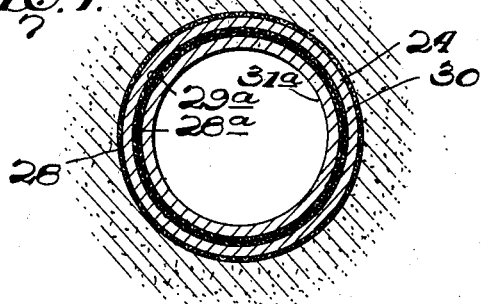
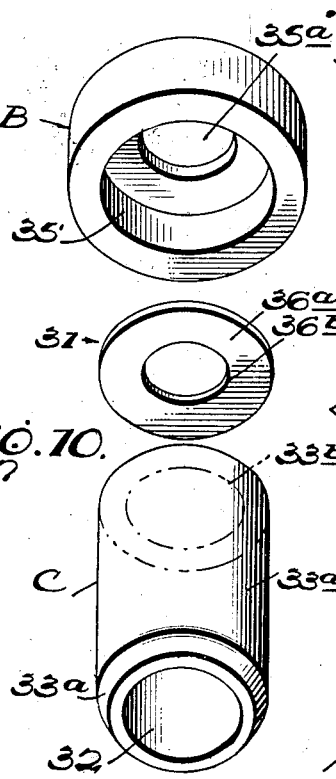
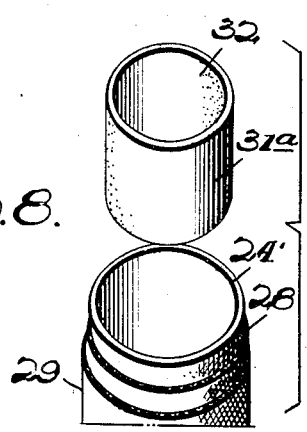
Inventor
John D. Wicks.
By
Attorney Patented Nov. 16, 1943

2,334,664

UNITED STATES PATENT OFFICE 2,334,664

FILTER REPLACEMENT UNIT

John D. Wicks, Gastonia, N. C., assignor to Accessories Corporation, Gastonia, N. C., a corporation of North Carolina Application February 25, 1943, Serial No. 477,114

11 Claims. (Cl. 210—131)

My invention relates to filter replacement units and the method of making the same.

The improved filter replacement unit comprised in the present invention is primarily adapted for use in connection with the lubricating systems of internal combustion engines of the automotive type. The invention, however, is capable of other uses and the same may, without modification, be employed in connection with other types of lubricating systems as well as in the filtering of fuel oil and the like.

Specifically, my invention relates to filter replacement units and the method of making the same embodying the cloth bag or cloth "sock" type as distinguished from "metal can" type filter replacement units. Such bag type filters in general consist essentially of a perforated central tube which is surrounded by a cylindrical mass of preferably fibrous vegetable material. The central perforate tube is sealed at its opposite ends by means of leather or cork washers or gaskets to prevent short circuiting of oil around the filtering media. Alternatively, the oil is admitted into the interior of the casing at the peripheral regions thereof and is induced to flow inwardly and enter the center perforated tube from whence it may be discharged through one or both ends thereof.

The principal object of the invention is to provide an inexpensive self-contained filter replacement unit of the type set forth above which is effective in removing solids from lubricating oils and to maintain the oil clear and of good color over a period of time and which may be inserted into and removed from its surrounding outer filter casing easily and quickly, thus facilitating replacement of an exhausted unit by a fresh one.

Another equally important object of the invention is to provide a cloth bag or sock type cartridge replacement element or unit for oil filters which employs a novel mechanical connection between the cloth sock and the upper and lower portions of the perforate center tube of the cartridge and which will serve the dual purpose of holding the usual cork or leather washer sealing elements permanently in position as an inherent part of the filter cartridge and at the same time anchor the cloth sock at the opposite ends of the unit to the ends of the central perforate tube.

It is a further object of the invention to provide a method of forming a sock type cartridge filter which is conducive toward the above mentioned results as well as towards simplicity and economy of manufacture as well as efficiency of operation.

Keeping in mind the exigencies of the present time and as will be seen hereinafter, the present filter cartridge is made from non-critical materials in its entirety. Where heretofore such filter cartridges have included a metallic central perforate tube, in the present invention this said metallic tube is supplanted by a tube made of suitably treated kraft paper and the means for anchoring the ends of the sock to the respective ends of the said perforate tube are wooden cylindrical plugs, thereby dispensing with any metallic anchoring means.

Other objects and advantages of the invention, not at this time set forth, will become apparent as the nature of the invention is better understood.

In the accompanying drawings forming a part of this specification, the invention has been illustrated in two embodiments thereof.

In these drawings:

Fig. 1 is a vertical sectional view taken substantially centrally through a filter cartridge and casing manufactured in accordance with the principles of the present invention.

Fig. 2 is a sectional view taken substantially along the line 2—2 of Fig. 1.

Fig. 3 is a partial vertical sectional view on an enlarged scale showing one end of the filter cartridge and the plug for connecting the sock to the central perforate tube.

Fig. 4 is an exploded view in perspective showing the manner in which the various parts of the filter unit are assembled.

Fig. 5 is a partial vertical sectional view similar to Fig. 1 showing a modified form of filter cartridge unit.

Fig. 6 is a vertical sectional view taken substantially centrally through a filter cartridge showing a further modification of my invention involving a novel ring-type means for securing the filter cartridge together as a unit.

Fig. 7 is a cross-sectional view taken substantially along the line 7—7 of Fig. 6.

Fig. 8 is an exploded view in perspective showing the manner in which the various parts of the filter unit are assembled.

Fig. 9 is a partial vertical cross-sectional view showing a further modification of the plug-like means for securing the ends of the filtering socks to the central tube, and Fig. 10 is an exploded view showing one of the aforesaid plugs as embodied in filter cartridge construction shown in Fig. 9.

In all of the above described views, like characters of reference are employed to designate like parts throughout.

Referring now to the drawings in detail and in particular to Fig. 1, wherein one embodiment of the invention is shown, the filter replacement unit or cartridge is designated in its entirety by the numeral 10 and is shown as being installed within an outer surrounding filter casing assembly 11 including the casing proper 12. The bottom of the casing 12 is generally rounded to provide an oil sump 13 and supports a hollow central post 14 having perforations 15 therein and the upper end of which is threaded interiorly, as at 16, to receive the threaded end of a cap screw 17 by means of which a dome-like cover 18 is securely held in position on the upper end of the casing 12.

The usual sealing ring or washer is shown at 19 and rests upon the upper rim of the casing and is disposed between the rim and the peripheral rim of the cover 18. An inverted ring-like cup-shaped spacer member 20 surrounds the central post 14 and rests upon the bottom of the casing 12, as shown. This spacer member 20, which prevents the original cartridge from going too far down the filter tube, also supports the filter replacement unit in proper position. The casing is provided with inlet and outlet ports 21 and 22, respectively. A suitable drain A is provided in the bottom of the casing to permit withdrawing sediment and solids collected in the sump 13.

The filter cartridge unit is centered about the central post 14 and is supported at its bottom on the spacer 20. A coiled spring 23 bears against the unit at the top thereof and yieldingly holds the latter in position within the casing.

The filtering unit 10 includes a central perforate tubular member 24 having both ends open and made of paper or other fibrous material but which is preferably made from brown kraft paper rolled under high pressure, without the treatment of critical chemicals, and using only a simple vegetable-oil to treat the tube which is then baked under suitable temperatures to render the same extremely rigid and long lasting in use in connection with the filter.

Perforations 25 extend radially through the walls of the tube and are spaced circumferentially and axially around and along the same. It is to be noted, however, that the perforations extend only to a point adjacent each end of the tube indicated at 26 and, therefore, the respective ends of the tube are imperforate as will be clearly seen in the exploded view, Fig. 4.

The cloth bag or sock material indicated in its entirety at 27 actually comprises two socks of material that is preferably knitted from short staple cotton, or yarn of "low number." The inner sock material is indicated at 28 and it will be seen that this sock is originally of tubular formation substantially of the same diameter as the perforate tube 24 and that it closely surrounds the latter and the length of the sock is such that the ends thereof project beyond the respective ends of the said perforate tube. The outer sock material 29, which is preferably formed of the same short staple cotton, as the inner sock material, it will be seen also surrounds the central perforate tube and the inner sock and is spaced from the latter and this outer sock is of a length greater than the length of the perforate tube and also is preferably of a greater length than the inner sock material.

It will be seen that the respective ends 28' and 29' of the inner and outer socks are tucked into the respective open ends of the central perforate tube, see Fig. 3, and that prior to tucking the ends of the socks in at one end, after an end has already been tucked in, suitable filtering material 30, such as cotton waste or the like, is placed in the sock between the inner sock 28 and the outer sock 29. This filtering material 30 is preferably placed within the sock while the latter is mounted in a suitable mold, not shown, so as to maintain the cylindrical shape of the filtering unit.

Suitable plugs, denoted in their entirety at 31, or rings 31a to be described hereinafter, are forcibly inserted into the respective ends of the perforate tube 24 after the tucking in of the ends of the inner and outer socks. These plugs 31 or rings are preferably cylindrical and have a central passageway therein denoted at 32. The portions 33 of the said plugs or the rings that are forcibly inserted into the ends of the tube are of reduced diameter and such size so that when said portion of the plug or the ring is forced into the tube, the same firmly compresses and fixes the tucked in ends of the socks into place. The ends 33 of the plugs are preferably tapered so as to permit ready insertion in the ends of the central tube.

In Fig. 3 it will be clearly seen that each plug is provided with a shoulder portion 34 which engages the turned-over portion of the outer sock and forces said turned-over portion and the turned-over portion of the inner sock into firm engagement with the extreme outer end of the tube. The top of each plug is provided with a counter-bore 35 into which is positioned a washer 36. This washer may be of cork, felt or any other suitable material but is preferably made from non-critical scrap leather and it will be noted that the top thereof is substantially in the same plane as the top of the plug.

Surrounding the top of the wooden plug there is a metal cap or sheath 37. This metal sheath 37 is preferably made from non-critical used oil-can stock or other such used metallic stock. It will be noted that the metallic cap 37 extends over a considerable portion of the scrap leather washer 36 and thereby protects the same and also serves to hold said washer in the counter-bore at the end of the plug. The scrap leather washer 36 is provided with a central opening 36' and this opening is of such diameter that it will firmly and closely engage the central post 14 and thereby prevent any leakage or short circuiting of oil at this point. The metal cap surrounding the outer portion of the plug is turned downwardly and swaged or spun inwardly beneath a shoulder formed on the cap, as shown at 37', thereby firmly securing the cap to the plug.

Prior to tucking in the ends of the socks into the end of the perforate tube, the non-perforated end of said tube, indicated at 24', see Fig. 4, is dipped into or otherwise coated with any hard setting glue or other adhesive. The reduced cylindrical portion 33 of the plug is also dipped into or otherwise coated with a similar type of hard setting glue or adhesive. The glue or adhesive on the plug and on the ends of the tube effects a sealing and a firm fixing of the respective ends of the socks in permanent engagement with the tube at its ends and, of course, prevents any displacement of the plugs at the end of the filtering unit relative to the central perforated tube and thereby maintains filtering media as a single unitary cartridge.

A looped handle or grip B is provided at the upper end of the filter replacement unit and the ends of this looped handle are inserted within the tube and held in such position by the top plug.

The inner sock 28, which closely surrounds the perforate center tube 24, serves to prevent lint or other foreign matter from the filtering material or from other sources from entering the perforations 25 in the center tube 24. The material from which the socks are made is, of course, flexible and stretchable and possesses a certain amount of resiliency.

In the embodiment of my invention as shown in Fig. 5, the same principles are embodied therein as described in connection with Figs. 1-4, inclusive. In this modification, however, it will be seen that the use of the metal cap 37 is dispensed with and that the scrap leather or cork washer 36 extends slightly above the plane of the top of the plug. In the type of filter shown in Fig. 5, the oil to be filtered enters at the top and flows through a central post and out through perforations therein and then through the perforations in the center tube 24 and then through the filtering material 30 and finally out through the outer sock 29. In this modification in Fig. 5 the coiled spring 23 exerts a downward pressure on the hollow cap 38 and firmly seats the flange 38' thereof directly against the top of the raised portion of the sealing washer 36. In other respects the modification of the invention in Fig. 5 is identical with the main embodiment of this invention as described hereinbefore.

In both the main embodiment of the invention and the modification in Fig. 5, I may adhesively secure the washers 36 in the counter-bores of the plugs.

In the manufacture of the filter cartridge replacement unit, the sock material, after being cut into proper lengths, is then attached to one end of the perforate tube 24 by tucking the ends of the inner and outer socks into the tube and inserting one of the wooden plugs 31 therein after a suitable glue or other adhesive has been applied to the portion 33 of the plug and to the non-perforated end 24' of the tube. The filtering media 30, while the unit is preferably in the mold, not shown, is then inserted between the inner and outer socks as shown clearly in the drawings and then the other ends of the two socks are likewise tucked into the opposite end of the perforated tube, and secured in place by a plug similar to the plug already described after this plug has had glue or adhesive applied to it and to the non-perforated end 24' of the central tube. The result will be a self-contained unitary filter cartridge of substantially cylindrical shape.

In the modification shown in Figs. 6, 7 and 8 suitable rings or ring-like short cylindrical members or plugs 31a are employed as a means for securing the socks to the central tubular member 24'. The said rings 31a are inserted within the respective open ends of the kraft paper tube 24' in the same manner as the hereinafter described plugs 31, and with the respective ends of the sock or bag material tucked in as previously described. As clearly seen in Fig. 6 the outer end of each ring 31a is in substantially the same plane as the top and bottom of the filter cartridge. The said rings are preferably treated in the same manner as the kraft tube 24 in order to render the same permanently rigid, and constitute in effect short cylindrical plugs in the same manner as the cylindrical portions 33 of the plugs 31 shown in Figs. 1-5 inclusive.

The rings 31a are relatively short cylindrical sections made of kraft paper open at both ends and provided with a central passageway 32, and the same and the ends of the tube 24' are coated with a glue or adhesive prior to assembly to complete cartridge form as previously described herein.

In the type of filter cartridge shown in Figs. 6, 7 and 8 the top and bottom of the filter cartridge abut flat plates P and consequently no seal is necessitated about the center tube. The filter assembly partially shown in Fig. 6 is held together by means of the coiled spring 23 in the filter cover in a manner somewhat as described with regard to Fig. 1.

In the modification of my invention as shown in Figs. 9 and 10, it will be seen that other than for the substitution of a two-part plug, indicated generally at 31, for the integral one-piece plug in Figs. 1-5 inclusive, the invention is precisely as hereinbefore described.

The two-part wood plug consists of a cap-piece or section B and a cylindrical body portion or section C. The cap-piece of the plug is counter-bored as at 35' on its underside and has a central opening 35a therein. The cylindrical section thereof is provided with an opening 32 and tapered end 33a and a plane surfaced end 33b. A relatively thin felt, or scrap leather or other sealing washer 36a is of such dimensions and shape as to fit snugly in the counter-bore 35' of the plug cap-piece and is held firmly, securely and permanently in such position by means of a portion of the end 33b of the cylindrical section which is of such size and shape as to telescope into and fit, preferably force-fit into the counter-bore 35', as clearly seen in Fig. 9. Prior to assembling the two-part plug the parts that are received within the counter-bore 35' are coated with a non-critical glue or adhesive which is impervious to oil and such parts of the plug including the cap-piece and the washer and the cylindrical section are all adhesively secured together as a unit, and are handled and assembled with the filtering cartridge as such.

These two-part plugs 31 are coated with an adhesive or glue the same as the integral plugs hereinbefore described regarding Fig. 1. It will be noted that the internal diameter of the opening 35a in the plug cap-piece B is just a little larger than the internal diameter of the central opening 36b in the felt or other sealing washer 36a. This construction permits use of a relatively thin sealing washer 36a, and such washer need not possess the strength as washers ordinarily used, such as the washers 36 shown in Figs. 1-5 inclusive. It is quite clear that only a very small portion of sealing washer 36a is exposed to the hot oil under pressure and consequently it need not possess the thickness and strength of a sealing washer such for instance as the washer 36 described regarding Figs. 1-5 inclusive.

It is to be understood that while reference above has been made in some instances to just one plug 31 or paper ring 31a, the same applies to the plug or ring, as the case may be, at the other end of the tube in that both plugs and rings and the tucking in of the ends of the socks at each end of the perforate tube 24 and tube 24' are identical.

Certain specific materials have been mentioned and such materials are at present non-critical. It is contemplated that in lieu of the specified materials, other non-critical materials may be used, for instance, the center tube 24 and 24' and the plugs 31 and rings 31a may be made of any suitable fibrous material or plastic material. The metallic cap 37 referred to in connection with Figs. 1 to 4 might be totally dispensed with and the filter unit would function properly and efficiently without the same.

In my application Serial No. 439,902, filed April 21, 1942, there is a more complete disclosure with regard to the filter as a whole and particularly as regards the modification shown in Fig. 5.

What is claimed is:

1. In a filter replacement unit consisting of a center tube, two spaced filter socks with filtering material therebetween, and hollow substantially cylindrical anchoring plugs, the center tube having open ends, one filter sock closely surrounding the tube and having its ends tucked into the respective open ends of the tube, the other filter sock surrounding both the tube and the first mentioned filter sock and enclosing between it and the first sock suitable filtering material and also having its ends tucked into the respective ends of the tube, and the hollow plugs forcibly positioned into the ends of the tube to thereby firmly and fixedly associate the two said socks and filtering material therebetween with the said tube and resulting in a unitary filter unit.

2. In a filter replacement unit as described in and by claim 1 wherein the ends of the tube carry an adhesive coating as do the plugs, thereby sealing and fixing the plugs and the ends of the socks in position.

3. In a filter replacement unit as described in and by claim 1, wherein the tube is composed of suitably treated and hardened paper.

4. In a filter replacement unit as described in and by claim 1, wherein the said plugs are of wood and the outer ends of the plugs are counterbored and a sealing washer is securely and fixedly held in the said counterbore.

5. In a filter replacement unit as described in and by claim 1, wherein each plug carries a sealing washer at its end and a metal cap surrounds the end of each plug and extends over the washer to protect and hold the sealing washer.

6. In a filter replacement unit as described in and by claim 1, wherein the said plugs are of wood and consist of a cap portion and a cylindrical body portion, the cap portion being counter-bored on its underside, a sealing washer mounted in said counter-bore, and the said body portion having one end portion thereof fitted into and securely held in the said counter-bore in engagement with the said washer therein.

7. In a filter replacement unit as described in and by claim 1, wherein the said plugs are of wood and consist of a cap portion and a cylindrical body portion, the cap portion being counter-bored on its underside, a sealing washer mounted in said counter-bore, and the said body portion having one end portion thereof fitted into and securely held in the said counter-bore in engagement with the said washer therein, by means of an adhesive applied in the counter-bore and to the end of the portion of the plug body inserted therein.

8. In a filter replacement unit consisting of a center tube, two spaced filter socks with filtering material therebetween, and hollow anchoring rings, the center tube having open ends, one filter sock closely surrounding the tube and having its ends tucked into the respective open ends of the tube, the other filter sock surrounding both the tube and the first mentioned filter sock and enclosing between it and the first mentioned sock suitable filtering material and also having its ends tucked into the ends of the tube, and the said rings forcibly positioned into the ends of the tube to thereby firmly and fixedly associate the two said socks and filtering material therebetween with the said tube and resulting in a unitary filter unit.

9. In a filter replacement unit as described in and by claim 8, wherein the ends of the tube carry an adhesive coating as do the rings, thereby sealing and fixing the rings and the ends of the socks in position.

10. In a filter replacement unit as described in and by claim 8, wherein the tube is composed of suitably treated and hardened paper.

11. In a filter replacement unit as described in and by claim 8, wherein the said rings are composed of suitably treated and hardened paper.

JOHN D. WICKS.